United States Patent Office 3,467,463
Patented Sept. 16, 1969

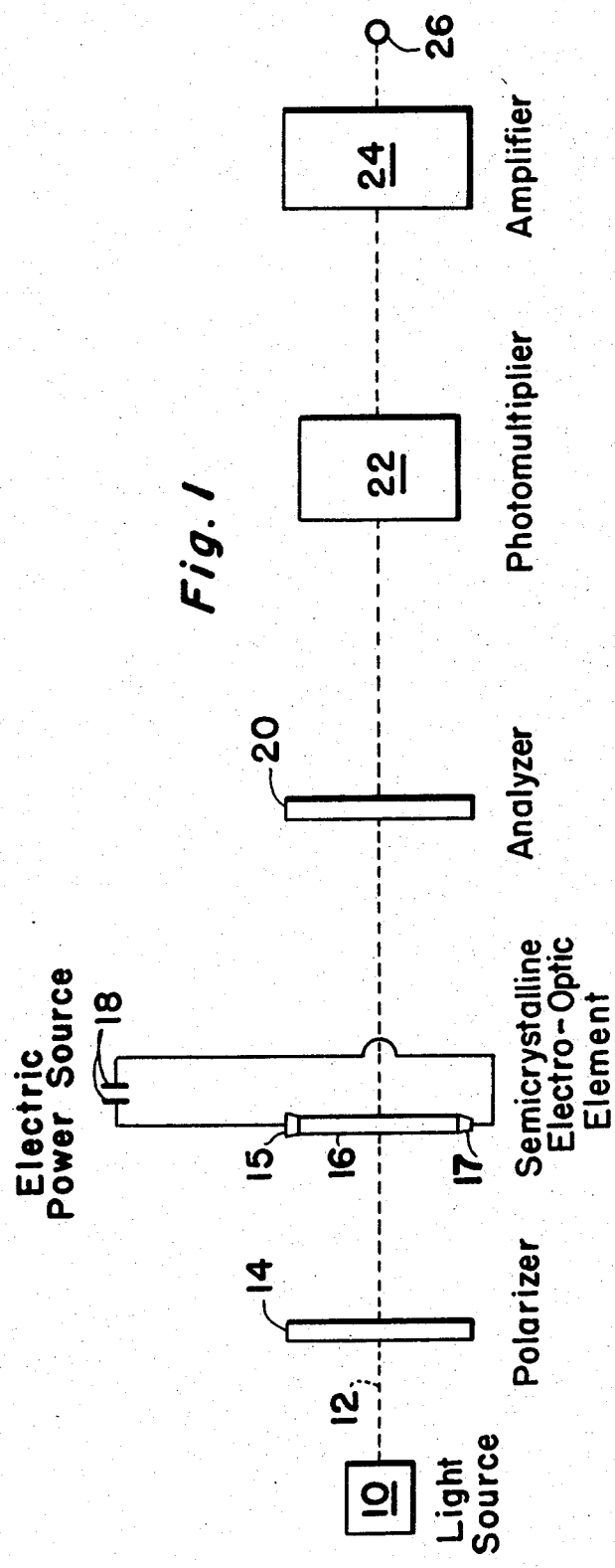
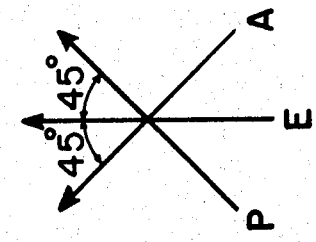
INVENTORS
Nicholas F. Borrelli
Andrew Herczog
Robert D. Maurer
William D. Fosdick
AGENT

3,467,463
ELECTROOPTIC DEVICE WITH BIREFRINGENT CRYSTALS EMBEDDED IN A GLASS MATRIX
Nicholas F. Borrelli, Elmira, and Andrew Herczog and Robert D. Maurer, Painted Post, N.Y., assignors to Corning Glass Works, Corning, N.Y., a corporation of New York
Filed Nov. 26, 1965, Ser. No. 509,812
Int. Cl. G02f 1/26, 1/24; G02b 5/30
U.S. Cl. 350—150                13 Claims

ABSTRACT OF THE DISCLOSURE

An electrooptic device in which an electrooptic element comprising a transparent semicrystalline body including submicroscopic birefringent crystals embedded in a glassy matrix is interposed between two polarizers. Light is directed through one polarizer into the electrooptic element and in the direction of the second polarizer. Variations in the amount of light passing through the second polarizer are effected by means of an electric field of light across the electrooptic element.

---

This invention relates to electrooptic devices for the modulation of light intensity, and more particularly to such devices employing novel and improved active elements for producing the electrooptic effect.

Electrooptic devices are well known and are described, for example, in United States Patent 3,069,973, to I. Ames. Such devices utilize variations in an electric field applied across a transparent active element to produce variations in the refractive index of the element in order to modulate the intensity of polarized light passing through the device. The devices comprise a controllable birefringent element located between two polarizers having their planes of polarization at right angles to one another. The light input passes through the first polarizer and enters the element as plane polarized light. In the absence of an electrical field across the active element, the plane polarized light passes through the element without rotation and is totally absorbed by the second polarizer. However, when an electrical field is applied to the element, the element becomes birefringent, and the light emerges from the element as elliptically or circularly polarized light, part of which passes through the second polarizer, or analyzer. An output device, such as a photomultiplier is placed on the side of the analyzer away from the active element and provides the output of the device.

Previous electrooptic devices have employed as their active elements only monocrystalline forms of various ferroelectric materials. The use of single crystals resulted from the belief that satisfactory polycrystalline materials free from deleterious surface effects due to grain boundaries and porosity and of sufficient transparency to provide electrooptic effects could not be produced. It was further believed that if randomly oriented crystals were embedded in noncrystalline matrices, the mechanical clamping of the crystals would present such a constraint that a sufficient realignment of the crystals with respect to the applied electric field, necessary for obtaining an electrooptic effect useful for devices, could not be obtained.

The present invention results from the discovery that certain polycrystalline materials dispersed in a glassy matrix exhibit effective electrooptic activity.

In United States Patent 3,114,066, to R. E. Allen and A. Herczog, there is described a group of high dielectric constant semicrystalline bodies produced by thermal conversion of suitable glasses. The present invention results from the discovery that the semicrystalline materials disclosed in the Allen et al. patent are highly efficient active elements when incorporated in electrooptic devices.

The invention will be described with reference to the accompanying drawing, in which:

FIGURE 1 is a schematic representation of an electrooptic device for modulation of light intensity according to the invention, and FIGURE 2 is a schematic illustration of the relationship between the direction of the applied electric field and the planes of polarization of the polarizer and analyzer.

Referring to the drawing, the light source 10, in the form of a gas laser with an output at 6328 A., directs a light beam along a light transmission path indicated by broken line 12. Polarizer 14 intercepts the light and polarizes it in a plane. After passing through polarizer 14, the light enters active element 16. Element 16 is a body of semicrystalline material formed from a glass comprising by weight 14.0% $SiO_2$, 15.0% $Na_2O$, 64.5% $Nb_2O_5$, 3.0% $CdO$, and 3.5% $TiO_2$. (Example 20 of Patent 3,114,066. The active element is in the form of a rectangular parallelepiped 2 x .32 x .13 cm. in dimension. The element is immersed in a silicone oil to avoid dielectric breakdown of ambient air at the voltages necessary for operation of the device. The light passes through the .13 cm. dimension of the element, and an electric field of 30 kv. per cm. is applied transverse to the direction of the light, across the .32 cm. direction, from electric power source 18 through electrodes 15 and 17 in contact with element 16. Analyzer 20 has its plane of polarization perpendicular to that of polarizer 14. Element 16 is tilted at an angle of 45° to the direction of the electric vector of the incident plane polarized beam, such that the electric field is applied at an angle of 45° with each of the planes of polarization of polarizer 14 and analyzer 20. This is indicated in FIGURE 2, wherein arrows P and A illustrate the planes of polarization of polarizer 14 and analyzer 20, respectively, while arrow E indicates the direction of the electric field.

The light passing through analyzer 20 is detected by photomultiplier 22 and amplified by amplifier 24 providing an output at 26. The light output of the device has been found to be a function of the square of the applied voltage. Above 3 kv. (approximately $10^4$ v./cm.) the light transmission follows the theoretical expression $$T = \sin^2 KE^2$$

where T is the transmission, E is the electric field, and K is an electrooptic constant characteristic of the material.

It has been found that all transparent semicrystalline materials produced according to the process of the above-mentioned Allen et al. patent, the disclosure of which is hereby incorporated by reference into the present disclosure, are satisfactory for use in the present electrooptic device. Such materials are those which comprise submicroscopic crystals of an oxygen-octahedral configuration selected from the group consisting of sodium niobate, barium niobate and mixtures thereof, dispersed in a glassy matrix. In order for such materials to exhibit adequate transparency, the crystal diameters should be not greater than the wavelength of the input light, and most desirably less than 1000 A. Electrooptic activity of the semicrystalline materials utilized in the present device has been found to be its greatest when a small amount of cadmium, up to approximately 10% by weight is included in the materials. Although all semicrystalline materials disclosed in the Allen et al. patent are satisfactory, it is preferable that such materials include at least 10% by weight of sodium niobate, barium meta-niobate or mixtures thereof.

A significant advantage accruing from the use of semicrystalline active elements in electrooptic devices results from the easy formability of such materials. Devices of desired shapes can be formed from suitable glasses and subsequently subjected to heat treatment to convert the glass to a semicrystalline material. A further advantage accruing from the use of semicrystalline materials in place of the previously used monocrystalline materials results from the higher electrical resistivities and dielectric breakdown strengths of semicrystalline materials.

The preferred embodiment of the invention has been illustrated as incorporating a polarizer and an analyzer oriented with their planes of polarization perpendicular to one another. In this embodiment of the invention, in the absence of an electric field, no light is passed by the device. In other embodiments of the invention, the polarizer and analyzer may have their planes of polarization in other relationships. For example, if the planes of polarization are parallel to one another, then light will be transmitted by the device in the absence of an electric field, while the presence of the field will decrease or eliminate the passage of light. Regardless of the relative orientations of the planes of polarization, some modulation of the intensity of the input light will be effected by an electric field. It will be appreciated that light intensity modulation in the illustrated device is accomplished through modulation of the polarization of a light beam. Accordingly, the subcombination comprising the described semicrystalline body, a light source, and means for applying an electric field thereacross has utility in and of itself for modulation of the polarization characteristics of a light beam. Such subcombination is, therefore, considered to be a part of the present invention.

We claim:

1. An electrooptic device capable of producing light having varying polarization characteristics, said device comprising a transparent semicrystalline body including submicroscopic crystals embedded in a glassy matrix, said crystals being of sufficiently small size so as not substantially to interfere with the transparency of said body, said crystals having birefringence characteristics which are modifiable in response to variations in an electric field imposed thereacross, means for directing polarized light into said body and means for applying an electric field across said body.

2. A device according to claim 1 in which said submicroscopic crystals are ferroelectric crystals of an oxygen-octahedral lattice configuration.

3. A device according to claim 1 in which said submicroscopic crystals include crystals of an oxygen-octahedral lattice configuration selected from the group consisting of sodium niobate, barium meta-niobate and mixtures thereof.

4. A device according to claim 3 in which said body comprises at least 10% crystals of an oxygen-octahedral lattice configuration selected from the group consisting of sodium niobate, barium meta-niobate and mixtures thereof.

5. A device according to claim 3 in which said submicroscopic crystals are of a diameter not greater than the wavelength of said light.

6. An electrooptic device for modulating the intensity of light, said device comprising an electrooptic component located on a light transmission path, first means located on said path for directing a beam of polarized light into said electrooptic component, and second polarizing means located on said path, said electrooptic component being at a location on said path between said first and second means, said electrooptic component comprising a transparent semicrystalline body including submicroscopic crystals embedded in a glassy matrix, said crystals being of sufficiently small size so as not substantially to interfere with the transparency of said body, said crystals having birefringence characteristics which are modifiable in response to variations in an electric field imposed thereacross, and means for applying an electric field across said electrooptic component.

7. A device according to claim 6 in which said submicroscopic crystals are ferroelectric crystals of an oxygen-octahedral lattice configuration.

8. A device according to claim 6 in which said submicroscopic crystals include crystals of an oxygen-octahedral lattice configuration selected from the group consisting of sodium niobate, barium meta-niobate and mixtures thereof.

9. A device according to claim 8 in which said polarizing components have their planes of polarization perpendicular to one another.

10. A device according to claim 8 in which said submicroscopic crystals are of a diameter not greater than the wavelength of light emitted by said light source component.

11. A device according to claim 10 in which said submicroscopic crystals are of a diameter than 1000 A.

12. A device according to claim 10 in which said body comprises at least 10% crystals of an oxygen-octahedral lattice configuration selected from the group consisting of sodium niobate, barium meta-niobate and mixtures thereof.

13. A device according to claim 10 which includes means for applying an electric field across said electrooptic component at an angle of 45° with each said plane of polarization.

References Cited

UNITED STATES PATENTS

| 2,277,008 | 3/1942 | Von Ardenne | 350—150 X |
| 3,069,973 | 12/1962 | Ames | 350—150 |
| 3,114,066 | 12/1963 | Allen et al. | 313—108 |

DAVID SCHONBERG, Primary Examiner

PAUL R. MILLER, Assistant Examiner

U.S. Cl. X.R.

350—147, 157